(12) United States Patent
Le et al.

(10) Patent No.: US 6,975,678 B1
(45) Date of Patent: Dec. 13, 2005

(54) APPARATUS AND AVERAGING METHOD FOR EQUALIZING SIGNALS

(76) Inventors: Vuong Kim Le, 218 Pacifica Way, Milpitas, CA (US) 95035; Hai Thanh Nguyen, 1187 Formosa Ridge Dr., San Jose, CA (US) 95127; Sushma Chandrasekaran, 110 Meadowland Dr., Milpitas, CA (US) 95035; Yu-Sheng Yang, 19316 Greenwood Dr., Cupertino, CA (US) 95014

( * ) Notice: Subject to any disclaimer, the term of this patent is extended or adjusted under 35 U.S.C. 154(b) by 864 days.

(21) Appl. No.: 09/823,583

(22) Filed: Mar. 30, 2001

(51) Int. Cl.[7] ............................................. H03H 7/30
(52) U.S. Cl. ..................................... 375/232; 375/346
(58) Field of Search ................................ 375/229, 230, 375/232, 346; 708/322, 323

(56) References Cited

U.S. PATENT DOCUMENTS

| | | | |
|---|---|---|---|
| 4,346,411 A * | 8/1982 | Buhler et al. .................. | 360/46 |
| 5,293,405 A * | 3/1994 | Gersbach et al. ............ | 375/232 |
| 5,764,695 A * | 6/1998 | Nagaraj et al. .............. | 375/232 |
| 5,841,810 A | 11/1998 | Wong et al. .................. | 375/232 |
| 5,978,417 A | 11/1999 | Baker et al. .................. | 375/232 |
| 6,363,111 B1 * | 3/2002 | Hee et al. ..................... | 375/224 |
| 6,438,162 B1 * | 8/2002 | Boyd et al. .................. | 375/232 |
| 6,459,669 B1 * | 10/2002 | Fujita et al. ................ | 369/59.1 |

OTHER PUBLICATIONS

Shakiba, "A 2.5Gb/s Adaptive Cable Equalizer," IEEE Journal of Solid-State Circuits, Frb. 17, 1999, 8 pages.

* cited by examiner

*Primary Examiner*—Young T. Tse
(74) *Attorney, Agent, or Firm*—Brett A. Hertzberg; Merchant & Gould P.C.

(57) ABSTRACT

An adaptive equalizer system and method uses an averaging algorithm to adjust equalization and amplitude for a data signal. Two sampled data points, spanning a sampling window, are obtained from the equalized signal. The data points are evaluated to determine when a signal condition persists long enough to require equalization adjustment, as well as evaluating persistent conditions in the amplitude of the received data signal. By monitoring persistent conditions in the equalized signal, the average signal received by the equalizer is compensated. The bit resolution of the equalizer control and the amplitude control can be selected for a desired resolution in a system. The incoming data signal is used to generate the requisite timing signals for sampling and control such that high frequency clock circuits and PLL techniques are unnecessary resulting in lower power consumption and reduced costs.

39 Claims, 13 Drawing Sheets

APPARATUS AND AVERAGING METHOD FOR EQUALIZING SIGNALS

FIELD OF THE INVENTION

The present invention relates to a method and apparatus for adaptively equalizing a signal at high data rates. In particular, the present invention relates to a method and apparatus that includes an equalizer circuit that has an adjustable gain, and a combination of analog and digital circuits that are arranged to control the adjustable gain to provide equalization and amplitude control of a signal.

BACKGROUND OF THE INVENTION

Data signals are degraded when transmitted over long lengths of cable. As the frequency of the data signal increases, the adverse effects on signal quality become more prevalent in the received signal. The data signal will become degraded in amplitude due to loss and phase dispersion from the cable.

Digital data signals consist of an infinite series of frequency components. High frequency digital data signals have very fast edges resulting in larger amplitudes in the high frequency components of the signal. Since the loss in the cable increases with frequency, the higher frequency components in fast edge digital data signals become greatly attenuated over distance when compared to the lower frequency components.

Equalization systems attempt to correct for high frequency losses and signal dispersion over cabling by boosting the higher frequency components of received data signals. High pass filters are used as equalizers to balance the frequency components of the received signal and attempt to reconstruct the fast edges found in the original data signal. The cable can be represented as a transfer function between the original signal and the received signal. By designing the high pass filter to have the inverse transform function of the cable's characteristics, the adverse effects of the cable loss can be eliminated.

The high pass equalization method may be represented as a simple capacitor and resistor network. Since the data signal is effectively AC coupled through the filter, a DC restore circuit is often required to recover a DC baseline for the incoming signal. DC servo circuits are often employed for this purpose. Once a proper DC level has been restored to the equalized signal, the data signal can be detected through a comparator circuit. The comparator and the DC restore circuit may be combined into a single circuit such as through the use of positive feedback from the output of the comparator. The output of such a comparator is a "sliced" version of the received data signal.

Phase locked loop and delay locked loop techniques may be used to provide adaptive equalization. The sliced data signal can be combined in a phase locked loop to adjust the high pass filter such that the transform function of the high pass filter closely matches the inverse transform of the cable.

SUMMARY OF THE INVENTION

In accordance with the present invention, an adaptive equalizer and amplitude control system adjusts equalization gain levels and amplitude levels of an incoming signal using an averaging algorithm. The system operates with reduced power consumption by eliminating the use of phase-locked loop types of techniques. The overall system design is scalable while performing high-speed operation without special clock generating circuits.

Briefly stated, the present invention relates to an adaptive equalizer system and method that uses an averaging algorithm to adjust equalization and amplitude control over an incoming data signal. The equalizer system couples the equalized signal through a sampling logic block to obtain two sample data points from the equalized signal, spanning a sampling window. Equalization control is accomplished by analyzing the sampled data points with a state machine that uses a counter to determine when a signal condition has persisted long enough to require equalization adjustment. Amplitude control is accomplished similarly with a state machine that analyzes the sampled data points for persistent conditions in the amplitude of the received data signal. A programmable peak detector is used to adjust the amplitude of the received signal. By monitoring persistent conditions in the equalized signal, the average signal received by the equalizer is properly compensated. The bit resolution of the equalizer control and the amplitude control can be increased as is necessary for a given resolution in a system. Since the equalization system uses the incoming data signal to generate the requisite timing signals for sampling and control, high frequency clock circuits and phase locked loop techniques are unnecessary resulting in lower power consumption and reduced costs. The equalizer settings from the analyzed incoming data signal may be applied to other equalizers that receive other data signals such that the equalizers share common control signals. The equalizer settings may be adjusted during an initialization cycle, periodically adjusted over time, or continuously adjusted as may be desired.

In accordance with a feature of the invention, an apparatus is directed to equalizing an input signal that has a pulse-width defined between a first edge and a second edge. The apparatus includes an equalizer circuit that produces an equalized signal in response to the input signal and an equalizer control signal such that the equalizer control signal selectively controls a characteristic of the equalizer to shape the equalized signal from the input signal. A data slicer circuit produces a data signal in response to the equalized signal, the data signal corresponding to a digital representation of the equalized signal. A comparator circuit produces a comparator output signal in response to a comparison between the equalized signal and a peak level signal. A sampling circuit samples data points within a sampling window in response to the comparator output signal and the data signal, the sampling window having edges that correspond to the pulse-width of the input signal. A digital control logic that produces the equalizer control signal in response to a persistent condition that is determined from the sampled data points such that the equalizer control signal adjusts the equalizer in response to the persistent condition.

In accordance with another feature of the invention, a method is directed to equalizing an input signal that has a pulse-width defined between a first edge and a second edge. The input signal is equalized to produce an equalized signal. The equalized signal is compared to a peak level to produce a comparator output. A first data point and a second data point are sampled from the comparator output, wherein the first and second data points correspond to sampled points that are within the pulse-width of the input signal. The first and second data points are analyzed to determine a condition of the equalized signal. The condition of the equalized signal is analyzed to determine when a persistent condition on the equalized signal exists. Equalization settings of the equalizer are adjusted in response to a persistent condition that persists for a predetermined interval such that the input signal is properly equalized.

In accordance with yet another feature of the invention, an apparatus is directed to an equalization system that includes a first sample point and a second sample point from an input signal that has pulse-width defined between a first edge and a second edge. The apparatus includes a means for equalizing the input signal that produces an equalized signal in response to the input signal and an equalization control signal. A means for comparing produces a comparator output signal in response to a comparison between the equalized signal and a peak level signal. A means for sampling samples the comparator output to produce the first sample point and the second sample point in response to the equalized signal and the comparator output signal, the first sample point corresponding to a sample of the comparator output signal after the first edge of the input signal, and the second sample point corresponding to another sample of the comparator output signal. A means for adjusting adjusts at least one of the peak level signal and the equalization control signal in response to the first sample point and the second sample point such that equalization of the input signal is adjusted.

Additionally, a means for analyzing determines a condition of the equalized signal by analyzing the first sample point and the second sample point. A means for determining persistence determines when the condition of the equalized signal becomes a persistent condition. The condition of the equalized signal may be an over-amplitude condition, an under-amplitude condition, an over-shoot condition, and an under-shoot condition. The condition of the equalized signal is persistent when the condition has continued for a predetermined number of consecutive occurrences. Furthermore, a means for increasing an equalization level increases the equalization level of the means for equalizing when the under-shoot condition is persistent, and a means for decreasing the equalization level decreases the equalization level of the means for equalizing when the over-shoot condition is persistent. A means for increasing the peak level signal may be employed to increase the peak level signal when the under-amplitude condition is persistent, while a means for decreasing the peak level signal may be employed to decrease the peak level signal when the over-amplitude condition is the persistent condition.

A more complete appreciation of the present invention and its improvements can be obtained by reference to the accompanying drawings, which are briefly summarized below, to the following detail description of presently preferred embodiments of the invention, and to the appended claims.

DETAILED DESCRIPTION OF THE PREFERRED EMBODIMENT

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal or data signal.

The present invention relates to a data receiver that receives an input signal. The data receiver includes an equalizer and various electronic circuits that control the equalizer. The electronic circuits adjust the equalization level based upon the received input signal. Digital control logic is utilized to change various control signals to adjust the equalization level. A peak detector (or detectors) are utilized to adjust a threshold level for detecting data in the receiver. The peak detector(s) are also controlled by the digital control logic. The output of the peak detectors and the equalizer output are used to generate sample data points from the received/equalized input signal. By analyzing the sample data points, an average equalization level can be determined such that the equalizer and the peak detector(s) can be properly adjusted to receive the input signal.

Figure 1:
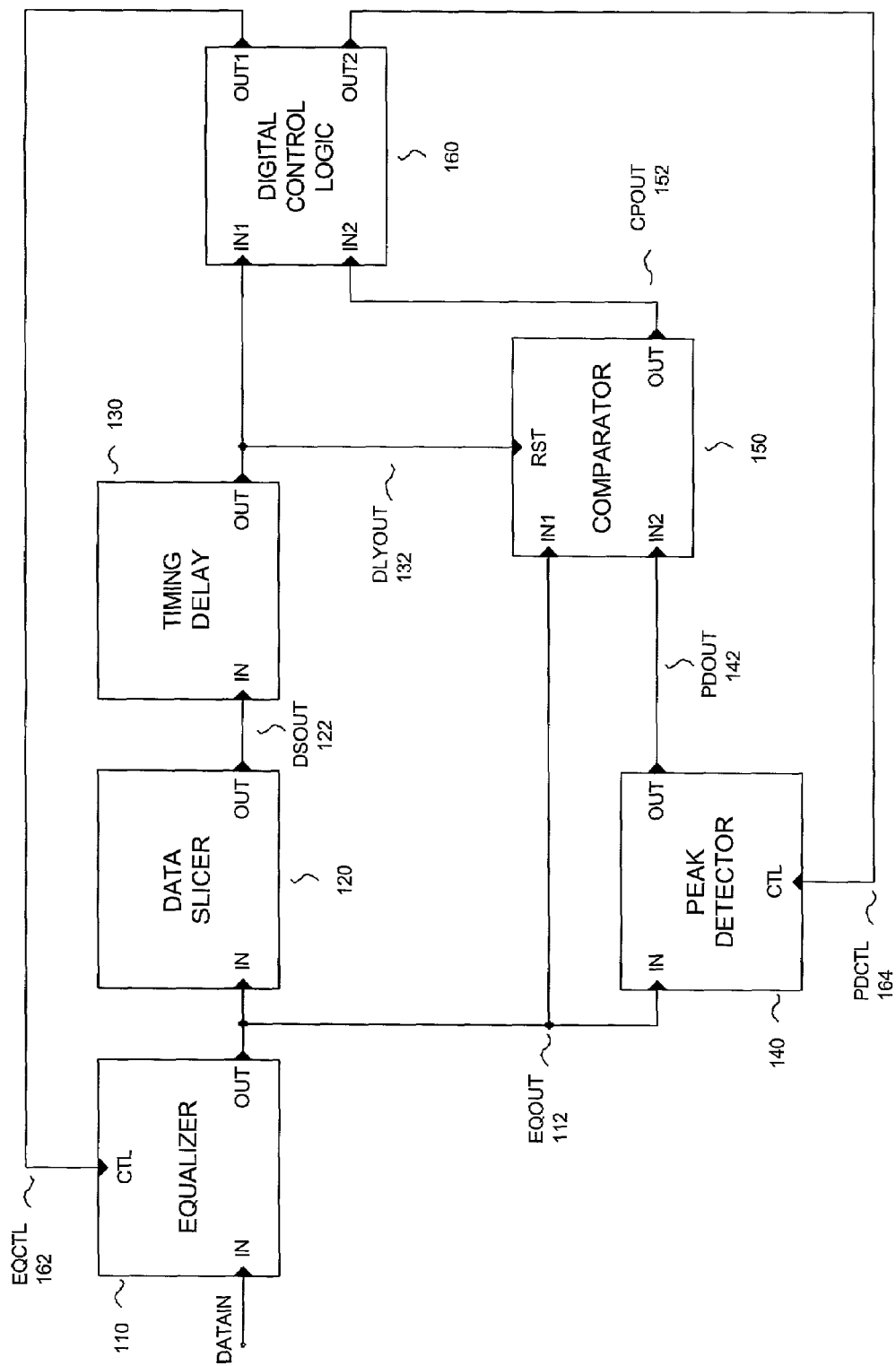
FIG. 1 is a schematic diagram of an equalization system.

FIG. 1 shows a schematic of an exemplary sampling system that includes adaptive equalization in accordance with the present invention. As shown in the figure, the system includes an equalizer (110), a data slicer (120), a timing delay (130), a peak detector (140), a comparator (150), and a digital control logic (160).

The equalizer (110) includes an input terminal (IN), an output terminal (OUT), and a control input terminal (CTL). The equalizer receives a data signal (DATAIN) through the input terminal (IN). The equalizer produces an output signal (EQOUT, 112) through the output terminal (OUT). The equalizer is controlled by a control signal (EQCTL, 162) that is received through the control input terminal (CTL). The shape of the output signal (EQOUT, 112) corresponds to a shaped version of the data signal (DATAIN), where the waveform shaping is controlled by the control signal (EQCTL, 162).

The data slicer (120) includes an input terminal (IN) and an output terminal (OUT). The input terminal (IN) of the data slicer (120) receives the output of the equalizer (EQOUT, 112), and couples an output signal (DSOUT, 122) to the output terminal (OUT) of the data slicer (120). The output (DSOUT, 122) of the data slicer (120) corresponds to data that is extracted from the output signal of the equalizer (EQOUT, 112).

The timing delay (130) includes an input terminal (IN) and an output terminal (OUT). The input terminal (IN) of the timing delay (130) receives the output of the data slicer (DSOUT, 122). The timing delay (130) produces one or more timing signals that are coupled to the output terminal (OUT) of the timing delay (130) as DLYOUT (132). The timing signal (DLYOUT) or signals are used as strobe signals for sampling in other circuits.

The peak detector (140) includes an input terminal (IN), an output terminal (OUT), and a control input terminal (CTL). The input terminal (IN) of the peak detector (140) receives the output signal from the equalizer (EQOUT, 112) through the input terminal (IN). The peak detector (140) produces an output signal (PDOUT, 142) through the output terminal (OUT). The peak detector is controlled by a control signal (PDCTL, 164) that is received through the control input terminal (CTL). The output signal (PDOUT, 142) from the peak detector (140) corresponds to the peak (or peaks) detected from the equalized signal (EQOUT, 112). The control signal (PDCTL, 164) controls the overall level of the peak detector as will be discussed later.

The comparator (150) includes two input signal terminals (IN1, IN2), a reset control terminal (RST), and an output terminal (OUT). The first input signal terminal (IN1) receives the output signal (EQOUT, 112) from the equalizer (110). The second input signal terminal (IN2) receives the output signal (PDOUT, 142) from the peak detector (140). The reset control terminal (RST) receives the output signal (DLYOUT, 132) from the timing delay (130). The comparator (150) produces an output signal (CPOUT, 152) through its corresponding output terminal (OUT). When the reset control terminal is not active (RST not active), the comparator output signal (CPOUT) corresponds to a comparison between the EQOUT signal (112) and the PDOUT signal (142).

The digital control logic (160) includes two input terminals (IN1, IN2) and two output terminals (OUT1, OUT2). One of the input terminals (IN1) receives the output signal (DLYOUT, 132) or signals from the timing delay (130). The other of the input terminals (IN2) receives the output signal (CPOUT, 152) from the comparator (150). The digital control logic produces control signals in response to the input signals (DLYOUT, CPOUT). One of the control signals (EQCTL, 162) is coupled through the one of the output terminals (OUT1). The other of the control signals (PDCTL, 164) is coupled through the other output terminal (OUT2). The EQCTL signal is used to adjust the equalization level in the equalizer (110). The PDCTL signal is used to adjust the peak detector output level in the peak detector (140).

Figure 2:
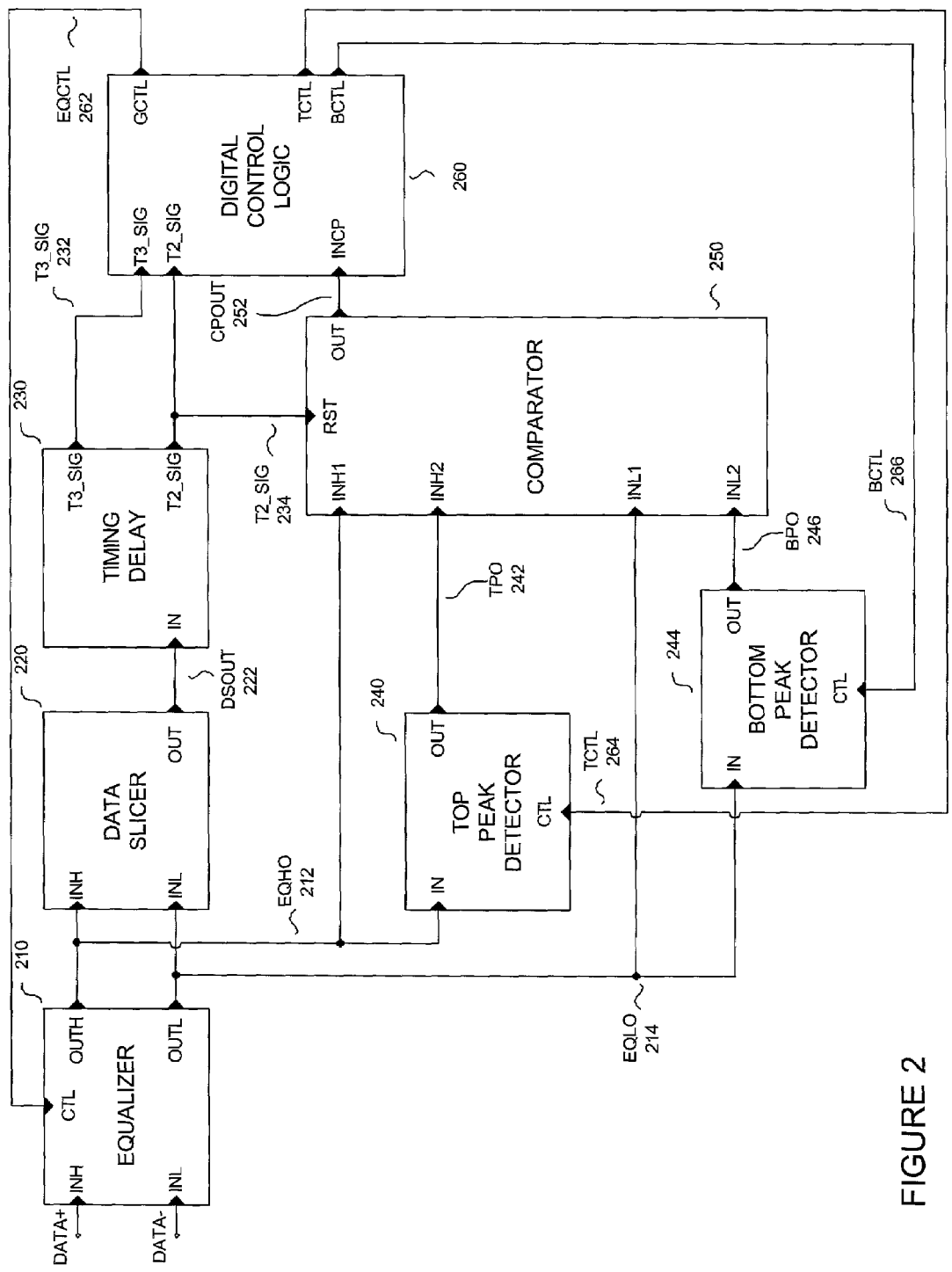
FIG. 2 is a schematic diagram of another equalization system.

FIG. 2 shows another example schematic of an exemplary sampling system that includes adaptive equalization in accordance with the present invention. As shown in the figure, the system includes an equalizer (210), a data slicer (220), a timing delay (230), a top peak detector (240), a bottom peak detector (244), a comparator (250), and a digital control logic (260).

The equalizer (210) includes a pair of input terminals (INH, INL), a pair of output terminals (OUTH, OUTL), and a control input terminal (CTL). The equalizer receives a differential data signal (DATA+, DATA−) through the input terminals (INH, INL). The equalizer produces a differential output signal (EQHO, EQLO) through the output terminals (OUTH, OUTL). The equalizer is controlled by a control signal (EQCTL, 262) that is received through the control input terminal (CTL). The shape of the differential output signal (EQLO, EQHO) corresponds to a shaped version of the differential input data signal (DATA+, DATA−), where the waveform shaping is controlled by the control signal (EQCTL, 262).

The data slicer (220) includes a pair of input terminals (INH, INL) and an output terminal (OUT). The input terminals (INH, INL) of the data slicer (220) receive the output signals (EQHO, EQLO) from the equalizer (210), and couples an output signal (DSOUT, 222) to the output terminal (OUT) of the data slicer (220). The output (DSOUT, 222) of the data slicer (220) corresponds to data that is extracted from the output differential signal (EQHO, EQLO) of the equalizer (210).

The timing delay (230) includes an input terminal (IN) and a pair of output terminals (T2_SIG, T3_SIG). The input terminal (IN) of the timing delay (230) receives the output of the data slicer (DSOUT, 222). The timing delay (230) produces one or more timing signals that are coupled to the output terminals of the timing delay (230) as T2_SIG (234) and T3_SIG (232). The timing signals (T2_SIG, T3_SIG) are used as strobes signals for sampling in other circuits.

The top peak detector (240) includes an input terminal (IN), an output terminal (OUT), and a control input terminal (CTL). The input terminal (IN) of the top peak detector (240) receives the top output signal from the equalizer (EQHO, 212) through the input terminal (IN). The top peak detector (240) produces an output signal (TPO, 242) through its output terminal (OUT). The top peak detector is controlled by a control signal (TCTL, 264) that is received through its control input terminal (CTL). The output signal (TPO, 242) from the top peak detector (240) corresponds to the peak level detected from the top equalized signal (EQHO, 212). The control signal (TCTL, 264) controls the overall level of the top peak detector as will be discussed later.

The bottom peak detector (244) includes an input terminal (IN), an output terminal (OUT), and a control input terminal (CTL). The input terminal (IN) of the bottom peak detector (244) receives the bottom output signal from the equalizer (EQLO, 214) through the input terminal (IN). The bottom peak detector (244) produces an output signal (BPO, 246) through its output terminal (OUT). The bottom peak detector is controlled by a control signal (BCTL, 266) that is received through its control input terminal (CTL). The output signal (BPO, 246) from the bottom peak detector (244) corresponds to the low peak level detected from the bottom equalized signal (EQLO, 214). The control signal (BCTL, 266) controls the overall level of the bottom peak detector as will be discussed later.

The comparator (250) includes four input signal terminals (INH1, INH2, INL1, INL2), a reset control terminal (RST), and an output terminal (OUT). The first input signal terminal (INH1) receives the top output signal (EQHO, 212) from the equalizer (210). The second input signal terminal (INH2) receives the output signal (TPO, 242) from the top peak detector (240). The third input signal terminal (INL1) receives the bottom output signal (EQLO, 214) from the equalizer (210). The fourth input signal terminal (INL2) receives the output signal (BPO, 246) from the bottom peak detector (244). The reset control terminal (RST) receives the output signal (T2_SIG, 234) from the timing delay (230). The comparator (250) produces an output signal (CPOUT, 252) through its corresponding output terminal (OUT). When the reset control terminal is not active (RST not active), the comparator block (250) outputs a signal (CPOUT) corresponding to the comparison of the differential equalized signal (EQHO, EQLO) and the differential amplitude levels (TPO, BPO).

The digital control logic (260) includes three input terminals (T2_SIG, T3_SIG, INCP), and three output terminals (GCTL, TCTL, BCTL). The T2_SIG and T3_SIG input terminals receive the T2_SIG output signal (234) and the T3_SIG output signal (232) from the timing delay (230). The INCP input terminal receives the output signal (CPOUT, 252) from the comparator (250). The digital control logic produces control signals in response to the input signals (T2_SIG, T3_SIG, CPOUT). One of the control signals (EQCTL, 262) is coupled through the one of the output terminals (GCTL). Another of the control signals (TCTL, 264) is coupled through the TCTL output terminal, while yet another control signal (BCTL, 266) is coupled though the BCTL output terminal. The EQCTL signal is used to adjust the equalization level in the equalizer (210). The TCTL signal is used to adjust the top peak detector (240) output level, while the BCTL signal is used to adjust the bottom peak detector (244) output level.

Figure 3:
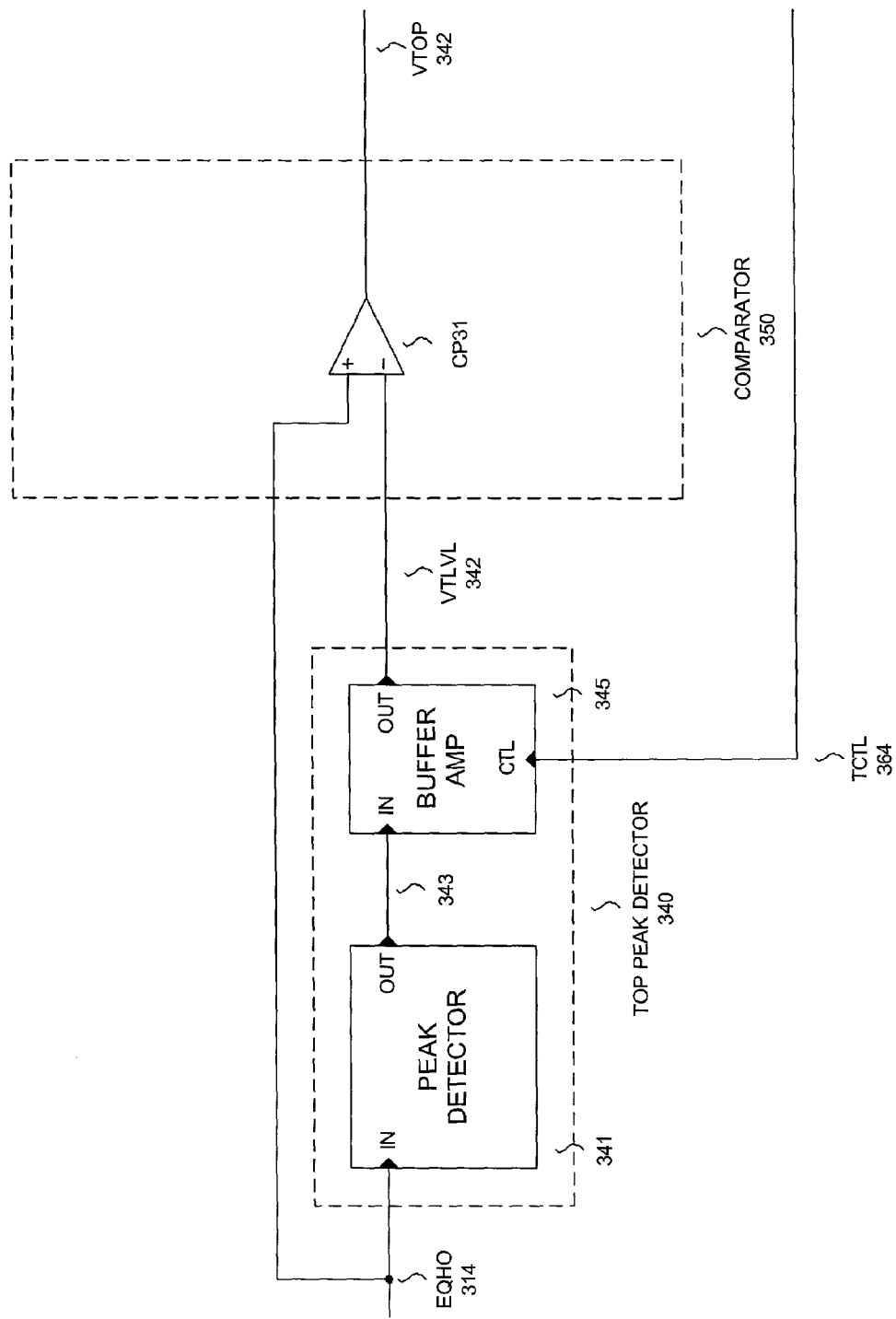
FIG. 3 is a schematic diagram of a comparator and peak detector in an equalization system.

An exemplary top peak detector cell is connected to a comparator as shown in FIG. 3. The top peak detector cell (340) includes a peak detector (341) and a buffer amplifier (345). The peak detector (341) includes an input terminal (IN) that is coupled to an equalized signal (EQHO, 314), and an output terminal (OUT) that is coupled to a node (343). The buffer amplifier (345) includes an input terminal (IN) that is coupled to node 343, an output terminal (OUT) that couples another signal (VTLVL, 342), and a control input terminal (CTL) that is coupled to a top control signal (TCTL, 364). The comparator cell (350) includes at least one comparator circuit (CP31), which is represented functionally as a standard differential comparator circuit. The non-inverting input of the comparator (CP31) is coupled to the equalized signal (EQHO, 314), while the inverting input of the comparator (CP31) is coupled to the output (VTLVL, 342) of the buffer amplifier (345). The output (VTOP, 342) of the comparator (CP31) is coupled to the digital control logic (not shown).

The top peak detector circuit (340) receives the output signal of the equalizer (EQHO, 314), detects the peak of the signal, and produces a buffered version of the detected peak. The overall level of the detected peak is adjusted by a gain setting in the buffer amplifier (345). Thus, the output level (VTLVL) of the buffer amplifier (345) corresponds to a gained (or attenuated) version of the detected peak signal. The digital control logic (not shown) sets the control signal for the buffer amplifier (TCTL, 364) based on various criteria including the output of the comparator (CP31). Thus, the threshold level (VTLVL) of the comparator (CP31) may be adjusted dynamically by the control logic (not shown).

As shown in FIGS. 1 and 2, equalization is performed on an incoming signal. Equalization is performed to compensate for loss of amplitude, shift in phase, as well as other effects such as noise on the incoming signal. The digital control logic shown in FIGS. 1 and 2 digitally controls the equalizer to provide optimal equalization. The system must determine any amount of undershoot, overshoot, over-amplitude, and under-amplitude that occurs in the output of the equalizer so that the equalizer controls can be set for optimal performance. The system analyzes sampled data points from the output of the equalizer to determine the condition of the equalized data-signal (i.e. undershoot, overshoot, etc.).

Two points are sampled from the equalizer output to determine the condition of the equalized data-signal. FIGS. 4–7 illustrate exemplary equalized signals (i.e. EQOUT 112 in FIG. 1), and corresponding output signals from the comparator (i.e. CPOUT 152 in FIG. 1). FIGS. 4–7 include an ideal data signal shown as a voltage waveform that varies over time. Sample points P1 and P2 are evaluation points for the comparator at times T1 and T3 respectively. The comparator outputs follow after the comparisons are made at times T1 and T3. For simplicity, changes in the output of the comparator will simply be referred to as "at time 1" or "at time T3".

Figure 4:
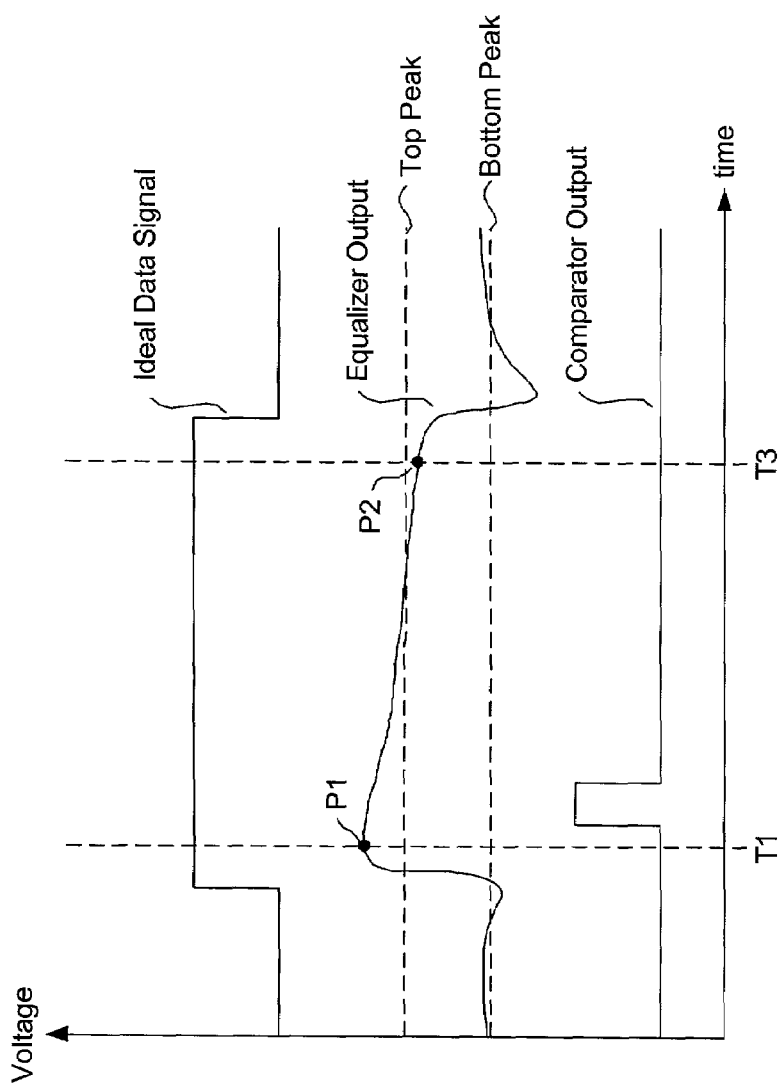
FIG. 4 is a graph of waveforms related to an over-equalized signal.

FIG. 4 illustrates an equalized signal that has excessive amounts of overshoot (over-equalized). The output of the equalizer overshoots the top peak level as shown by sample point P1 at time T1. At time T3, the signal drops to a level below the top peak level as shown by sample point P2. The comparator output level at time T1 is a high logic level, while the comparator output level at time T3 is a low logic level. Overshoot may be caused by excessive amounts of gain in the equalizer as well as other causes that are known to one of ordinary skill in the art having read the above discussion.

Figure 5:
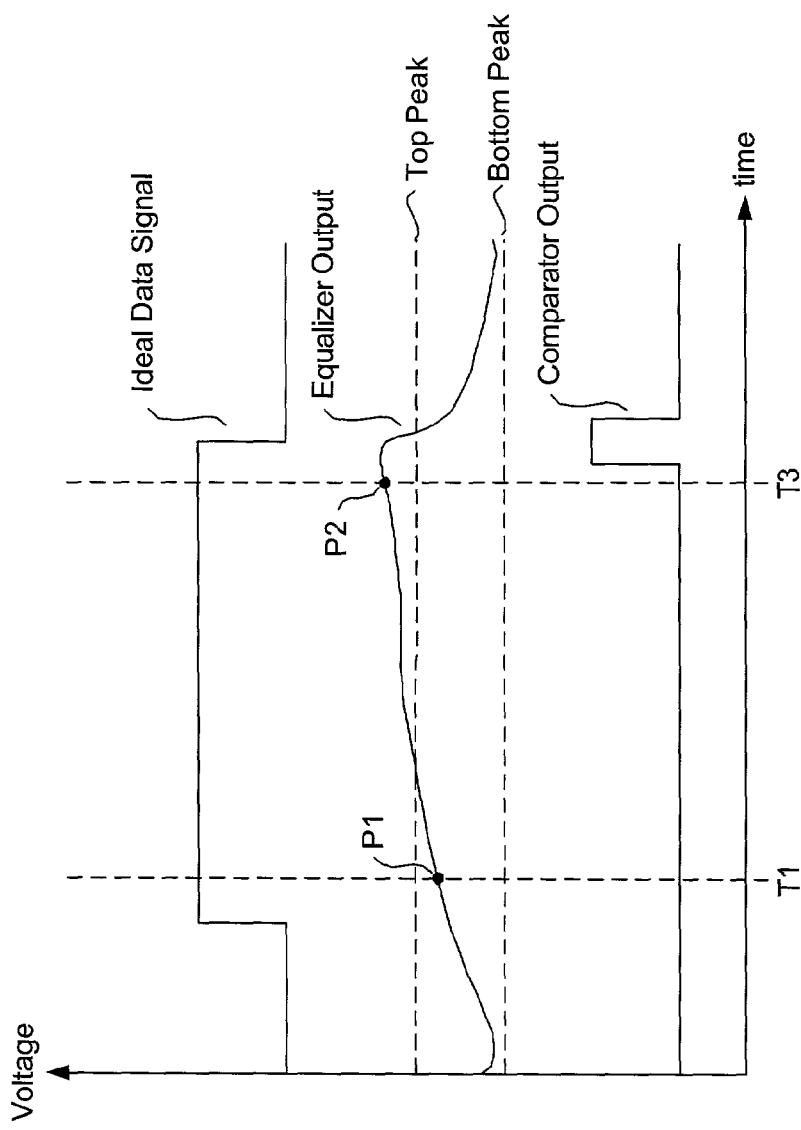
FIG. 5 is a graph of waveforms related to an under-equalized signal.

FIG. 5 illustrates an equalized signal that is under-equalized as shown by excessive amounts of undershoot. The output of the equalizer undershoots (does not reach) the top peak level as shown by sample point P1 at time T1. At time T3, the signal exceeds the top peak level as shown by sample point P2. The comparator output level at time T1 is a low logic level, while the comparator output level at time T3 is a high logic level. Undershoot may be caused by insufficient amounts of gain in the equalizer as well as other causes that are known to one of ordinary skill in the art having read the above discussion.

Figure 6:
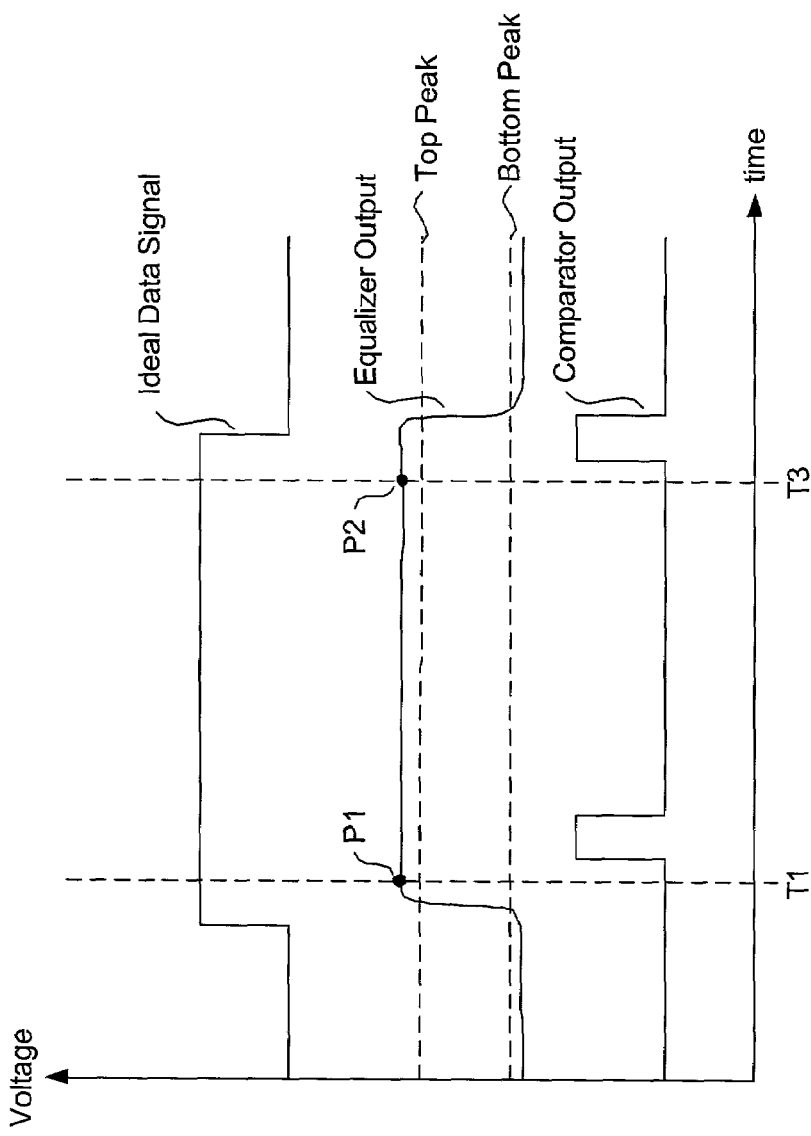
FIG. 6 is a graph of waveforms related to an over-amplitude adjusted signal.

FIG. 6 illustrates an equalized signal that has excessive amounts of amplitude (over-amplitude). The output of the equalizer exceeds the top peak level at times T1 and T3 as shown by sample points P1 and P2. The comparator will output a high logic levels at times T1 and T3. In this instance, the peak levels should be appropriately adjusted as will be discussed later.

Figure 7:
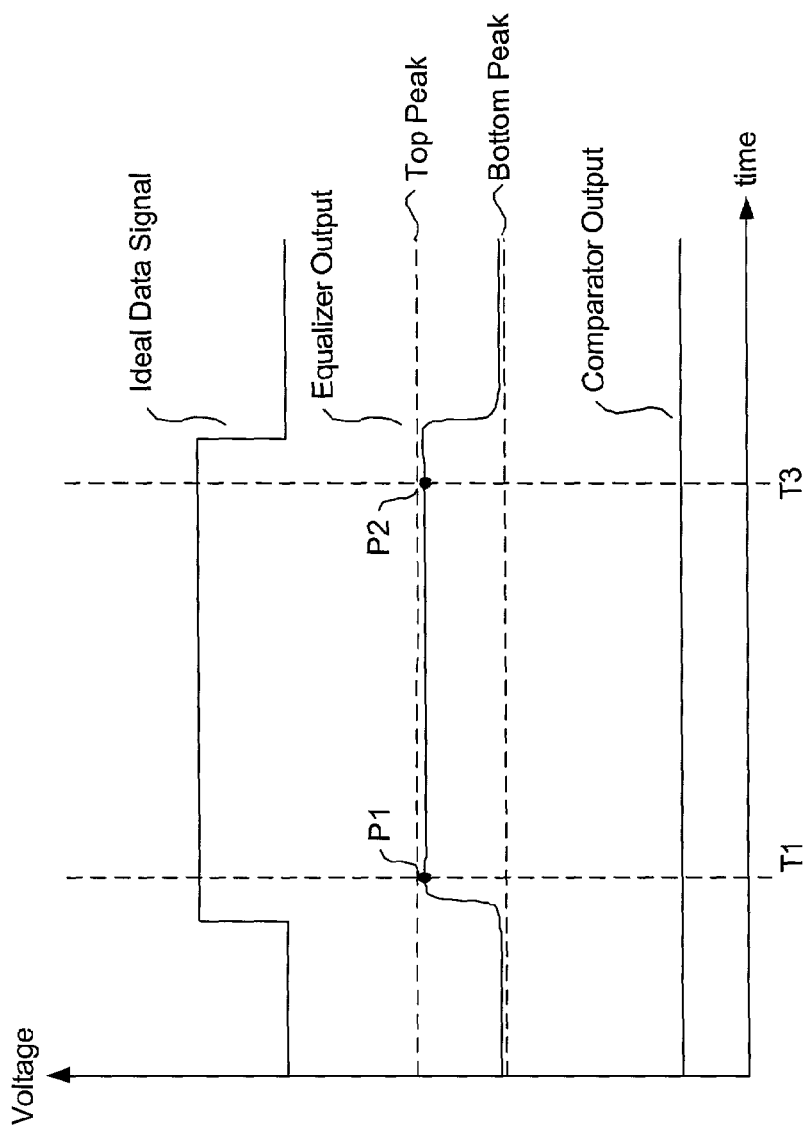
FIG. 7 is a graph of waveforms related to an under-amplitude adjusted signal.

FIG. 7 illustrates an equalized signal that has insufficient amplitude levels (under-amplitude). The output of the equalizer fails to exceed the top peak level at times T1 and T3 as shown by sample points P1 and P2. The comparator will output a low logic levels at times T1 and T3. As with case of over-amplitude signals, the peak levels should be appropriately adjusted as will be discussed later.

The data slicer shown in FIGS. 1 and 2 operate similar to a comparator that converts an analog waveform into a digital waveform. The data slicer receives a signal from the output of the equalizer and outputs a signal that has the same duty cycle and distortion of the equalized signal in digital form. The data slicer can be designed using comparators, inverters, as well as other combinations of analog and digital electronic devices that are configured to convert an analog signal to a digital logic signal. In one example of the present invention, the data slicer receives a differential analog signal and converts the differential analog signal to a differential digital signal. In another example of the present invention, the data slicer receives a differential analog signal and converts the differential analog signal to a single ended digital signal. In light of the above discussion, other arrangements for the data slicer are possible without departing from the scope of the invention.

The timing delay block produces strobe signals that are used by the digital control logic and the comparator. As shown in FIG. 2, two strobe signals (T2_SIG and T3_SIG) are generated by the timing delay cell (230). The strobe signals are used to sample data from the equalized signal as described with reference to FIGS. 4–7. In one embodiment of the present invention, the frequency of the T3_SIG strobe signal is approximately the same as the output signal from the data slicer, and the frequency of the T2_SIG signal is approximately twice that of the output signal from the data slicer. The pulse-widths of the T2_SIG and T3_SIG signals are fixed widths that are narrower than the incoming signal pulse-width. The pulse-widths of the T2_SIG and T3_SIG signals need not be the same as one another.

The T2_SIG pulse occurs a fixed interval after the data signal changes from one logic level to another. In one embodiment, the T2_SIG pulses low for a fixed interval after the output signal from the data slicer changes logic states. The T2_SIG pulse can be generated by various methods including but not limited to combinational logic combined with skewed inverter/delay circuits. The T3_SIG pulse is generated in a similar way as T2_SIG. In one embodiment, the T3_SIG signal pulses from a logic low to a logic high a time interval after the output signal from the data slicer changes from a high logic level to a low logic level.

The comparator block receives a periodic reset pulse from the T2_SIG signal of the timing delay block. In one example, the comparator output is reset to a low logic level after receiving a low logic level reset pulse. While the reset pulse is inactive (high logic level), the comparator compares the input signals to the comparator and provides a logic output corresponding to the comparison. In one example, the inputs to the comparator (e.g., EQOUT and PDOUT) are single ended logic signals such as shown in FIG. 1. In another example, the inputs to the comparator (e.g. EQHO, EQLO and TPO, BPO) are differential signals and the comparator performs a differential comparison to determine the output logic signal such as shown in FIG. 2.

Figure 8:
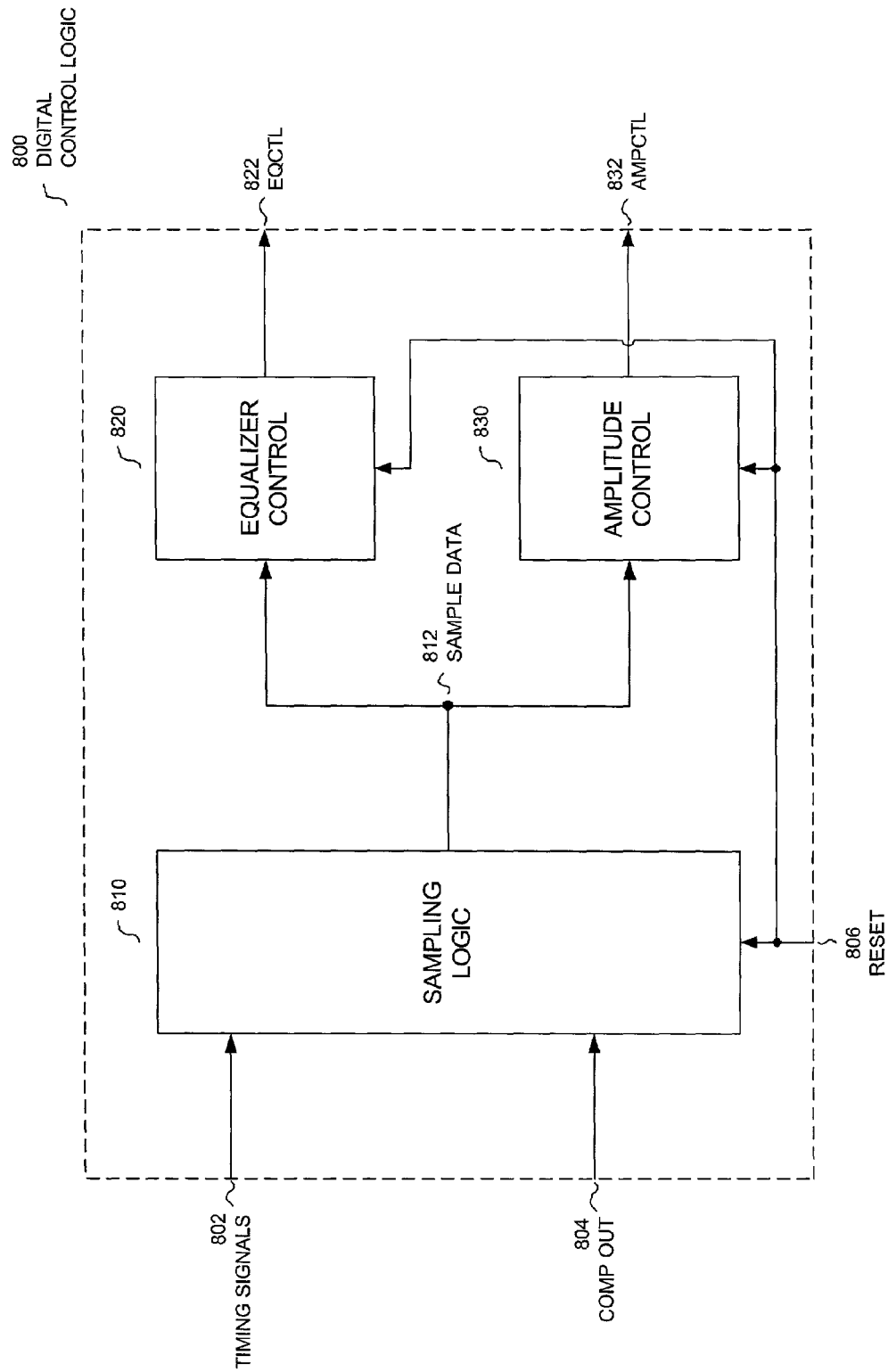
FIG. 8 is a schematic diagram of a digital control block in an equalization system.

In accordance with the present invention, an exemplary digital control logic block is shown in FIG. 8. The digital control logic (800) includes a sampling logic block (810), an equalizer control block (820) and an amplitude control block (830). The sampling logic block (810) receives timings signals (802) and comp_out (804) from the timing delay and comparator blocks (see FIGS. 1 and 2). For example, in one embodiment of the present invention the timing signals (802) correspond to T2_SIG and T3_SIG and the COMP_OUT signals (804) correspond to CPOUT (252) as shown in FIG. 2. The sampling control generates sample data (812) in response to the input signals. The equalizer control block (820) receives the sample data (812) and produces an equalizer control signal (822, EQCTL). The amplitude control block (830) receives the sample data (812) and produces an amplitude control signal (AMPCTL, 832). A reset signal (806) is also received by the sampling logic (810), the equalizer control (820), and the amplitude control (830) blocks. The reset signal (806) may be used to periodically reset the digital control logic block such that the output signals are in a predictable state. In one example, the reset signal corresponds to a power-on reset signal that initializes all logic in the system. In light of the above described features in the present invention, it is understood and appreciated that blocks 810–830 may be combined or separated into one or more, and additional blocks may be included in the digital control logic.

Figure 9:
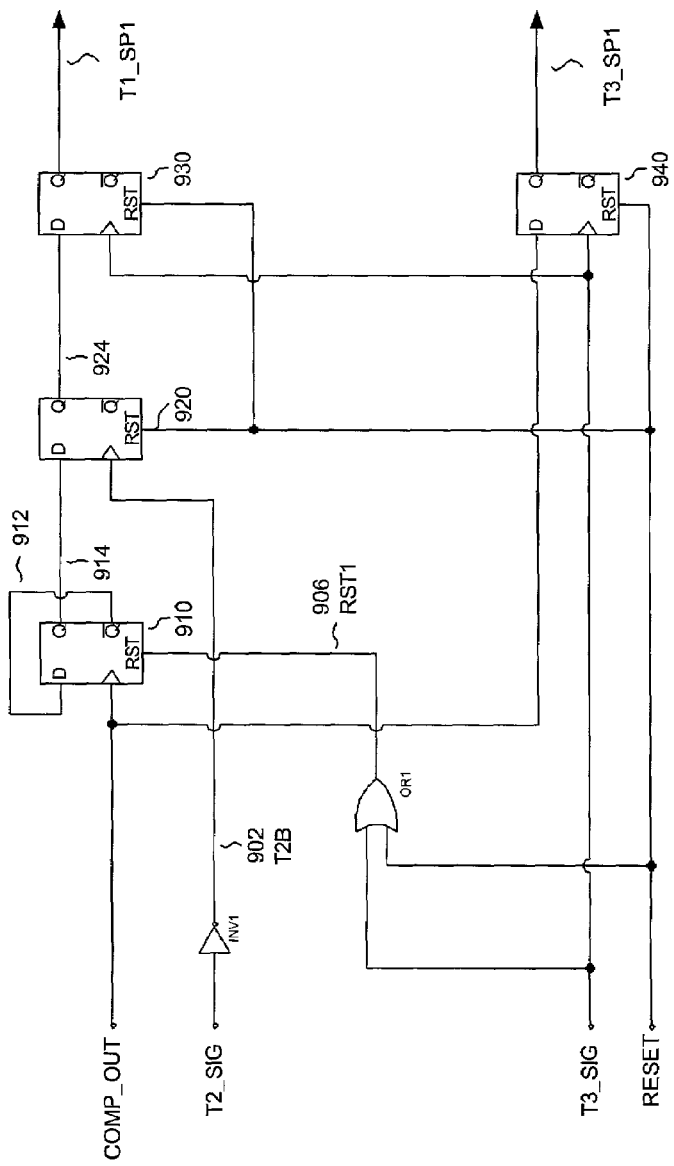
FIG. 9 is a schematic of sampling logic in an equalization system.

The digital control logic block uses the timing signals (e.g., T2_SIG and T3_SIG) signals together with the output signal from the comparator (COMP_OUT) to generate sample data points. A schematic representation of an exemplary sampling logic from the digital control logic block is shown in FIG. 9. The exemplary sampling logic includes four flip-flop circuits (910, 920, 930 and 940), each having a D input, a clock input, a reset input (RST), and Q and NQ output terminals.

The sampling logic also includes an inverter (INV1) and a logical OR gate (OR1) to generate signals for controlling the flip-flops (910, 920, 930, 940). The first inverter (INV1) produces a first signal (902, T2B) from a first timing signal (T2_SIG). The logical OR gate (OR1) produces another reset signal (906, RST1) from the reset signal (RESET) and a second timing signal (T3_SIG).

The first flip-flop (910) is arranged with a data signal (COMP_OUT) coupled to the clock input, the NQ output (912) is coupled to the D input, and the RST input is coupled to a first reset signal (906, RST1). The Q output (914) from the first flip-flop (910) is coupled to the D input of the second flip-flop (920). The second flip-flop (920) is arranged with an inverted version of the T2_SIG timing signal (902, T2B) coupled to the clock input, and the reset signal (RST) is coupled to the reset signal (RESET). The Q output (924) from the second flip-flop (920) is coupled to the D input of the third flip-flop (930). The third flip-flop (930) is arranged with the second reset signal (RST) coupled to the reset signal (RESET), and the second timing signal (T3_SIG) is coupled to the clock input. The Q output (T1_SP1) of the third flip-flop (930) serves as an output signal corresponding to the first sample point discussed previously. The fourth flip-flop (940) is arranged with the data signal (COMP_OUT) coupled to the D input, the second timing signal (T3_SIG) coupled to the clock input, and the reset signal (RESET) coupled to the RST input. The Q output (T3_SP1) of the fourth flip-flop (940) serves as an output signal corresponding to the second sample point discussed previously. The data signal (COMP_OUT) shown in FIG. 9 corresponds to an output from a comparator such as the comparators shown in FIGS. 1 and 2.

The first flip-flop (910) is used to sample the first data point from the incoming signal. The second flip-flop (920) is used to store the first sampling point so that the first flip-flop (910) can be reset by the second timing signal (T3_SIG). The third flip-flop (930) is used to synchronize the first sampling point with the second timing signal (T3_SIG) so that the first and second sampling points appear at their respective outputs (T1_SP1, T3_SP1) at the same time. The fourth flip-flop (940) is used to sample the second sampling point.

The RESET signal is held at a high logic level in order to initialize the sampling circuit. The RST will be a high logic level during initialization, causing all four flip-flops (910–940) to be reset such that the Q outputs are reset to a low logic level. In one example of the present invention, the RESET signal pulses high when it is desired to initialize the logic under a power-on-reset condition. In another example, the RESET signal pulses high periodically to reinitialize the equalizer and amplitude adjustments. The operation of the circuit shown in FIG. 9 will proceed under normal operation after the RESET signal changes to a low logic level.

During normal operation, the output of the comparator (COMP_OUT) is used to clock the first flip-flop (910). By using the comparator output to clock the flip-flop, the first sampling point is as close as possible to the transition of the incoming data. After initialization (flip-flops are reset), the first transition from low to high in the incoming signal (COMP_OUT) will cause the Q output (914) of the first flip-flop (910) to change from a low logic level to a high logic level. The operation of the flip-flops (910–940) will now be discussed with reference to FIGS. 10–11.

Figure 10:
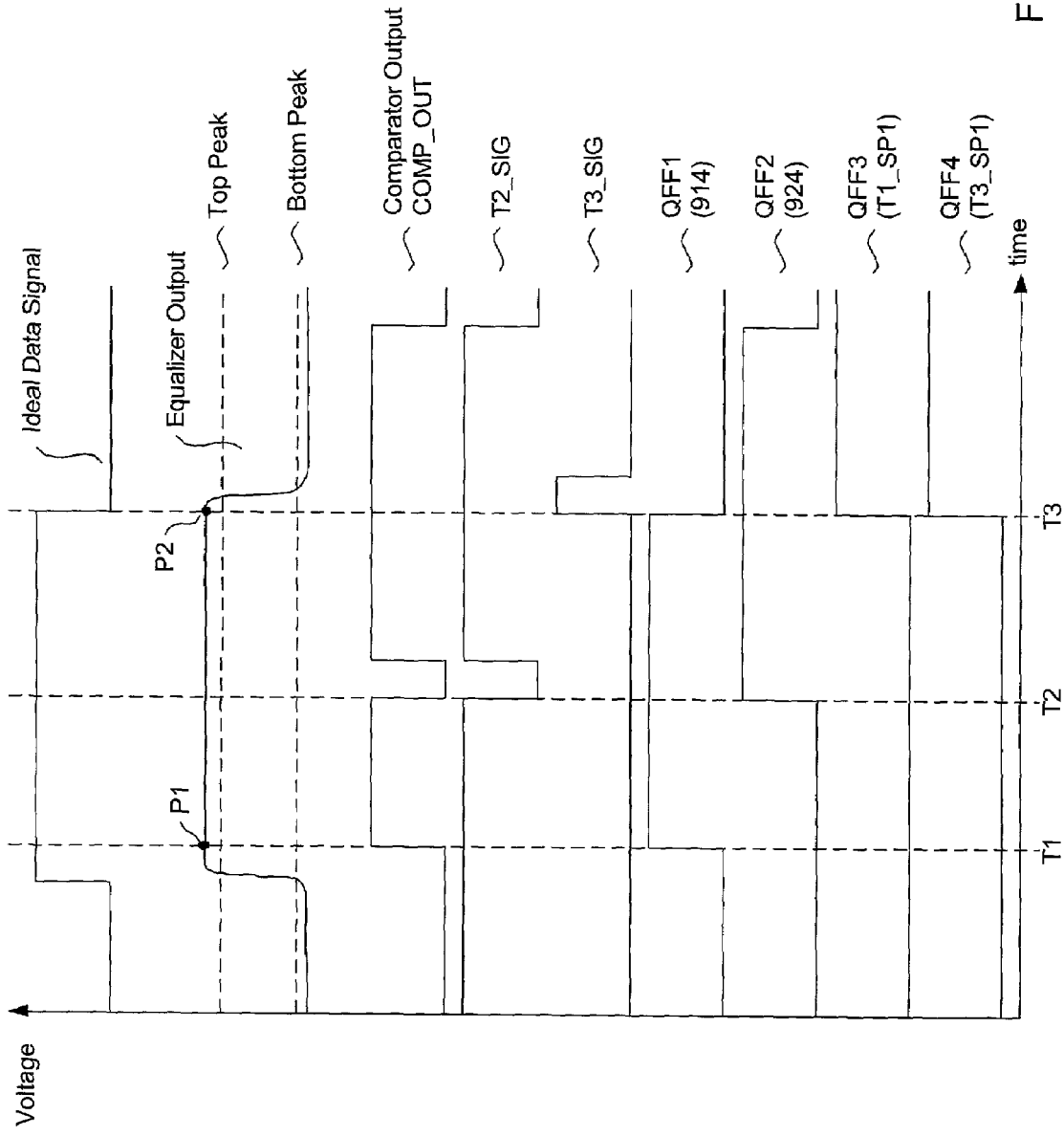
FIG. 10 is a graph of waveforms related to the sampling logic shown in FIG. 9.

In FIG. 10, the output of the equalizer is higher than the top peak level at times T1, T2 and T3. Initially, all of the flip-flops (910–940) are reset causing the Q outputs (914, 924, T1_SP1, T3_SP1) to set to a low logic level. At time T1, the comparator output (COMP_OUT) transitions from low to high causing the first flip-flop (910) to set the Q output (914) to a logic high signal. A short time after the transition of the equalizer output signal (at time T2), the timing signal T2_SIG pulses from high to low, causing the second flip-flop (920) to latch the first sampled data point (914) to the Q output (924). At time T3 the equalizer output change from a high level to a low level and the T3_SIG timing signal pulses from low to high for a fixed time interval. The T3_SIG pulse causes the first flip-flop (910) to reset the output (914) to a low logic level, and the Q output (924) of the second flip-flop (920) is latched into the Q output (T1_SP1) of the third flip-flop (930). At the same time the T3_SIG pulse causes the fourth flip-flop to latch the comparator output (which is still high) into the Q output (T3_SP1) of the fourth flip-flop (940). A short time after the equalizer output transitions from a high level to a low level, the T2_SIG timing signal will pulse low again, causing the second flip flop (920) to set the Q output (924) to a low logic level, and simultaneously resetting the comparator output to a low logic level.

In FIG. 10, both points P1 and P2 of the Equalizer Output signal are above the top peak level. By using the sampling circuit previously described, sample points T1_SP1 and T3_SP1 both correspond to a logic high level at time T3. Thus, sample points T1_SP1 and T3_SP1 match with the fact that Equalizer Output signal is above the top peak level at both times T1 and T3. In other words, the sampling circuit functions as a means of translating the condition of the equalized data signal to a logic high or low as reflected by sampling points T1_SP1 and T3_SP1. Sampling points T1_SP1 and T3_SP1 may be used to determine if a particular persistent condition occurs.

Figure 11:
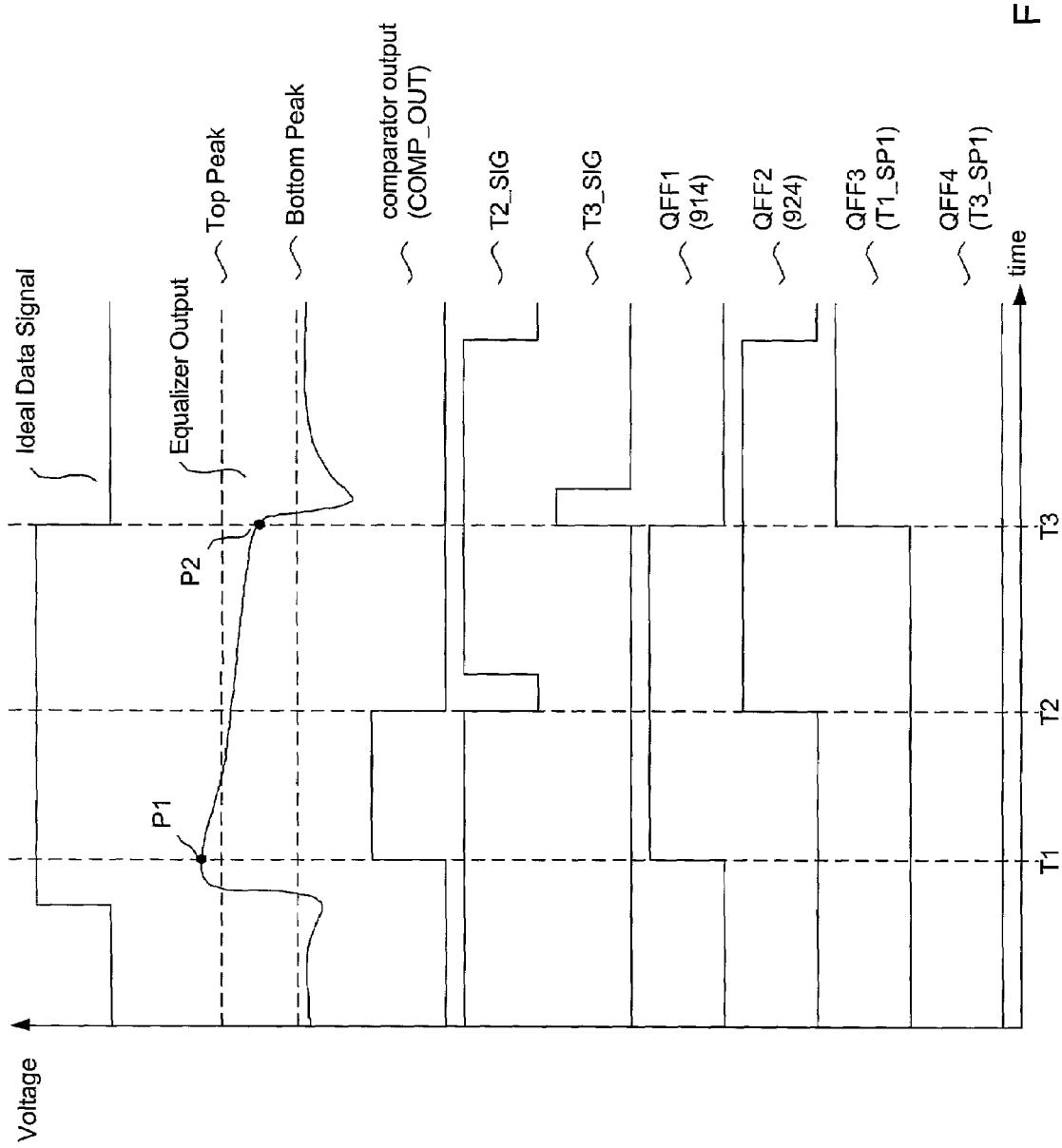
FIG. 11 is another graph of waveforms related to the sampling logic shown in FIG. 9.

In FIG. 11, the output of the equalizer (Equalizer Output) is higher than the top peak level at time T1, and lower than the top peak at times T2 and T3. Initially, all of the flip-flops (910–940) are reset causing the Q outputs (914, 924, T1_SP1, T3_SP1) to set to a low logic level. At time T1, the comparator output (COMP_OUT) transitions from low to high causing the first flip-flop (910) to set the Q output (914) to a logic high signal. A short time after the equalizer output signal drops below the top peak level (at time T2), the timing signal T2_SIG pulses from high to low, causing the second flip-flop (920) to latch the first sampled data point (914) to the Q output (924). At time T3 the equalizer output signal further drops from a high level to a low level and the T3_SIG timing signal pulses from low to high for a fixed time interval. The T3_SIG pulse causes the first flip-flop (910) to reset the output (914) to a low logic level, and the Q output (924) of the second flip-flop (920) is latched into the Q output (T1_SP1) of the third flip-flop (930). At the same time, the T3_SIG pulse causes the fourth flip-flop to latch the comparator output (which is low) into the Q output (T3_SP1) of the fourth flip-flop (940). A short time after the equalizer output transitions from a high level to a low level, the T2_SIG timing signal will pulse low again, causing the second flip flop (920) to set the Q output (924) to a low logic level, and simultaneously resetting the comparator output to a low logic level.

In FIG. 11, point P1 shows that Equalizer Output signal is above the top peak level and point P2 shows that Equalizer Output signal is below the top peak level. By using the sampling circuit previously described, T1_SP1 corresponds to a logic high level at time T3 and T3_SP1 corresponds to a logic low level at time T3 respectively. Thus, sample points T1_SP1 and T3_SP1 match with the fact that Equalizer Output signal is above top peak level at time T1 and below top peak level at time T3. In other words, the sampling circuit functions as a means of translating the condition of the equalized data signal to a logic high or low as reflected by sampling points T1_SP1 and T3_SP1. Sampling points T1_SP1 and T3_SP1 may be used to determine if a particular persistent condition occurs.

Each time the incoming data (COMP_OUT) transitions from low to high, the Q output (914) of the first flip-flop (910) will change to a high logic level. The sampling window is maximized by sampling the comparator output signal instead of using another timings signal to latch the comparator output. The sampling window is defined as the time interval between the positive edge of the data signal at time T1 and the rising edge of the T3_SIG timing signal. Since the circuit utilizes pulse signals T2_SIG and T3_SIG that are generated from the incoming signal, the equalizer system uses less power without the need for a high frequency clock generator. The flip-flops used in the sampling circuit consume very little power, have low set-up and hold times, and need not be high speed. Standard cell flip-flops and logic can be used allowing the equalizer design to be scalable.

The sampling points (sample data, 812) from a sampling circuit such as shown in FIG. 8 are used to algorithmically determine adjustments to the equalizer gain (EQCTL, 822) and amplitude settings in the equalizer system (AMPCTL, 832). By collecting the sample data (812), the equalizer control logic makes decisions on equalization control based on an averaging algorithm. Similarly, the amplitude control logic makes decisions on amplitude control based on another averaging algorithm.

Figure 12:
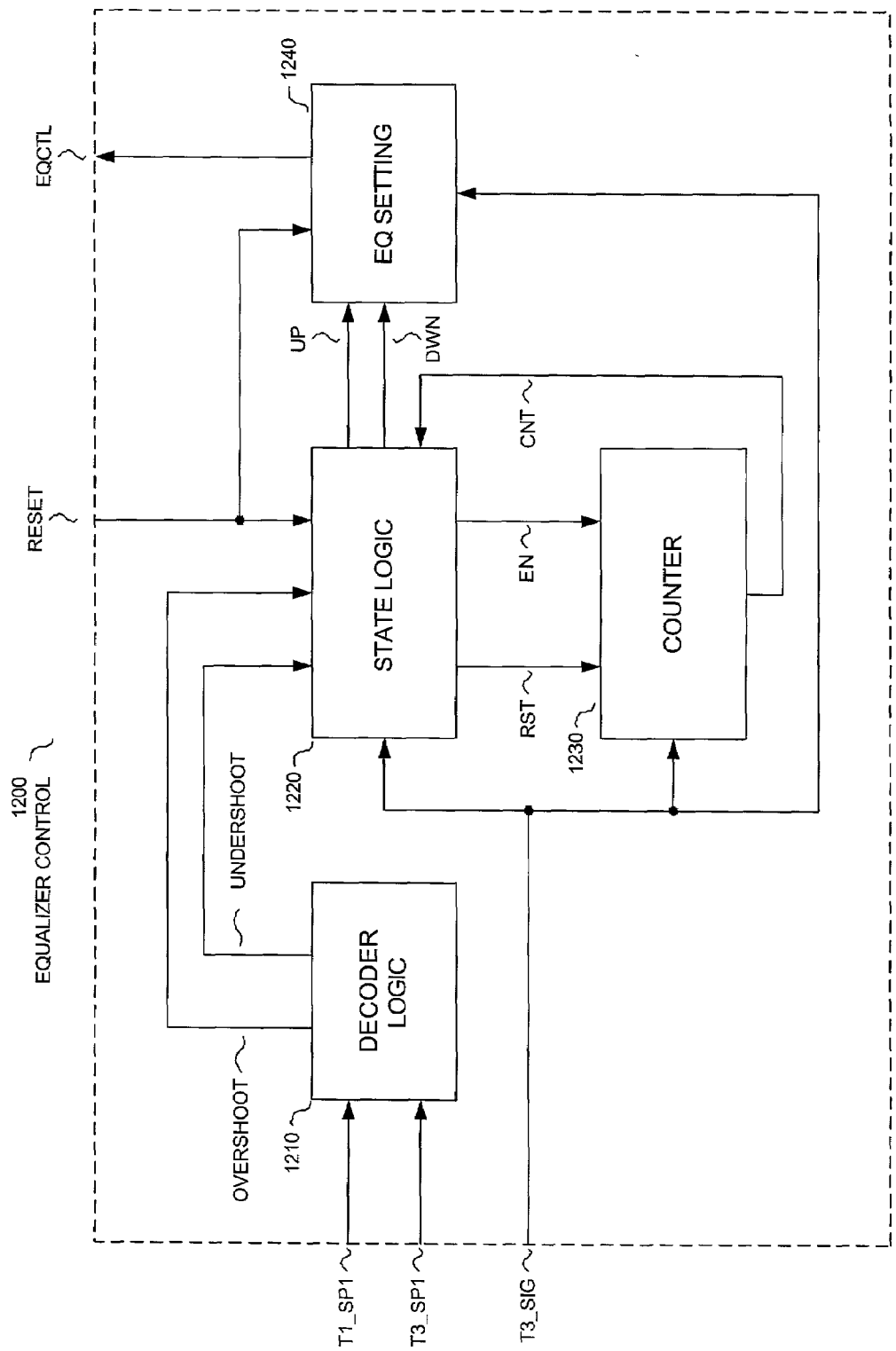
FIG. 12 is a schematic diagram of an equalizer control block in an equalization system.

An example averaging algorithm control logic for equalization control is shown in FIG. 12. The equalizer control (1200) includes a decoder logic block (1210), a state logic block (1220), a counter block (1230), and an equalizer setting block (1240). The decoder logic block (1210) receives the sample data points (T1_SP1, T3_SP1) from the sampling logic block previously discussed, and generates two signals (OVERSHOOT, UNDERSHOOT. One of the timing signals (T3_SIG) from the timing delay block previously discussed is used as a clock signal for the state logic (1220). The timing signal (T3_SIG) may also be used as a clock signal for the counter (1230) and equalizer setting (1240) blocks. The state logic (1220) generates four output signals (RST, EN, UP and DWN) in response to five signals (OVERSHOOT, UNDERSHOOT, $T3_{13}$ SIG, CNT and RESET) that it receives. The counter block (1230) generates a count signal (CNT) in response to the RST, EN, and T3_SIG signals. The equalizer setting block (1240) produces the EQCTL signal in response to the UP, DWN, $T3_{13}$ SIG, and RESET signals.

The decoder logic (1210) determines the current signal condition (OVERSHOOT, UNDERSHOOT, or neither OVERSHOOT nor UNDERSHOOT) based on the sample points as discussed previously with reference to FIGS. 4–7. In this example, only one of the OVERSHOOT and UNDERSHOOT signals can be active simultaneously, or neither the OVERSHOOT nor the UNDERSHOOT signal is active. During each clock cycle (e.g., T3_SIG), the state logic evaluates the input signals UNDERSHOOT, OVERSHOOT, and CNT. The counter (1230) will count the number of times that the UNDERSHOOT or OVERSHOOT signal is active, corresponding to the number of occurrences of the overshoot and undershoot signal condition in the current data signal. The EN line is asserted by the state logic (1220) each time a condition persists. The counter (1230) increases the current count (CNT) each clock cycle that the EN line is active.

In one embodiment of the present invention, the state logic (1220) will not change the current equalizer settings (EQCTL) unless one of the above-discussed conditions persists for more than a predetermined number of clock intervals. For example, N− consecutive clock intervals of OVERSHOOT results in the state logic (1220) determining that the equalizer setting (EQCTL) should be decreased, while N-consecutive intervals of UNDERSHOOT results in the state logic (1220) determining that the equalizer setting should be increased. The UP and DOWN signals are activated by the state logic (1220) to increase or decrease the equalizer setting. When the signal condition changes to the opposite signal condition during a particular count (i.e., changes from OVERSHOOT to UNDERSHOOT), the state logic (1220) resets the counter (1230) by asserting the RST signal.

In one example of the present invention, the counter (1230) is not reset by the state logic (1220) when the current signal condition changes from either of the OVERSHOOT and UNDERSHOOT conditions to neither the OVERSHOOT nor the UNDERSHOOT condition. An example system may require N time intervals of the OVERSHOOT condition before determining that the equalizer setting (EQCTL) should be decreased. If at any time before the Nth time interval (i.e., N−1) the current condition changes to UNDERSHOOT, the counter (1230) will be reset. However, if the current signal condition changes at a time interval before the Nth time interval (i.e., N−1) from OVERSHOOT to neither the OVERSHOOT nor the UNDERSHOOT condition, the counter (1230) will retain the current count and not be reset. Alternatively, the state logic (1220) may be arranged to reset the counter (1230) whenever the current signal condition changes from one condition to any other condition.

In another embodiment of the present invention, the reset and enable lines (RST, EN) for the counter (1230) are the same control line. The current equalizer setting (EQCTL) corresponds to a number of control bits (K) that are used by the equalizer. The number of equalizer control bits (K) can be increased or decreased to adjust the stepping resolution of the equalizer.

Figure 13:
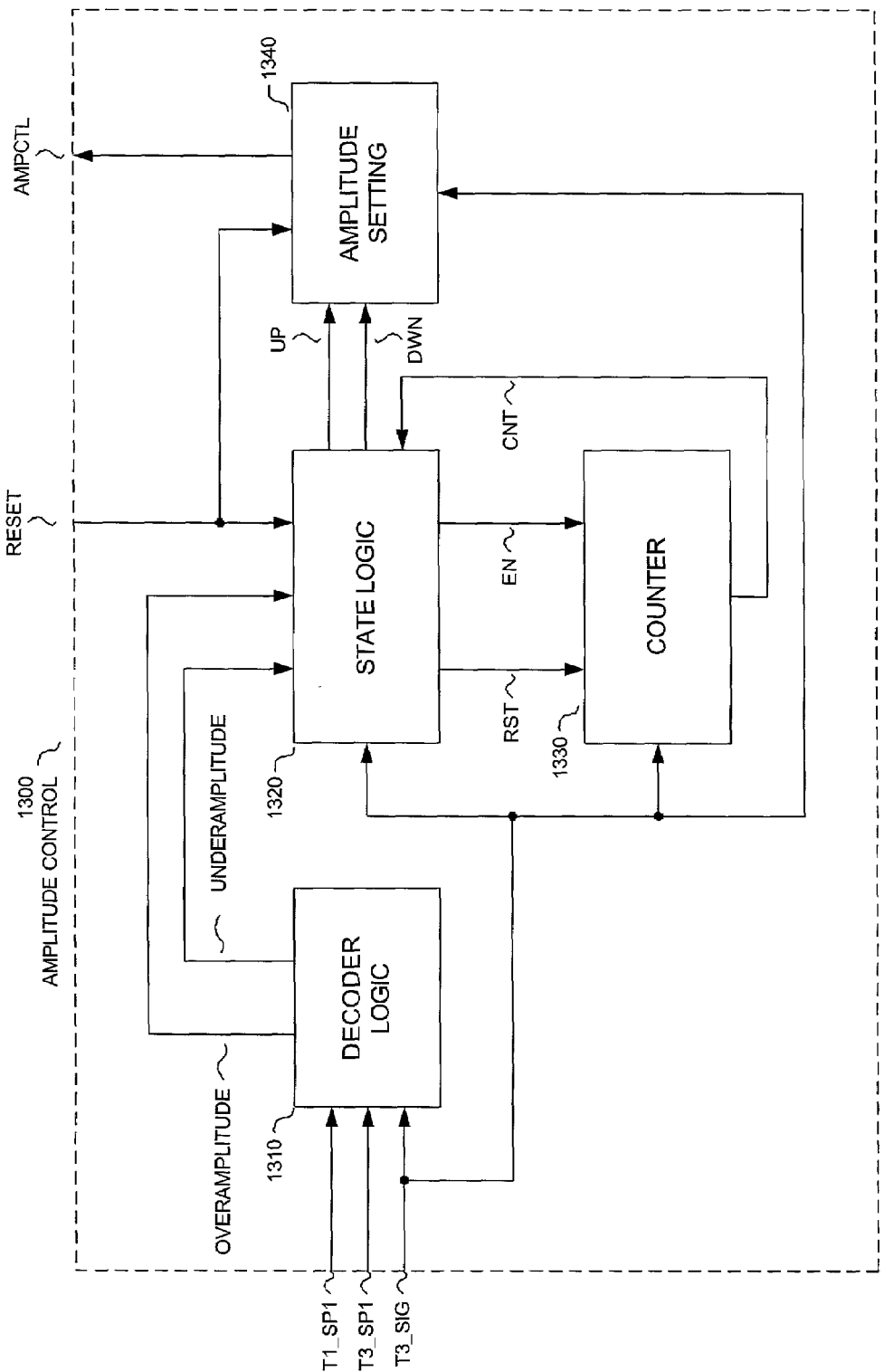
FIG. 13 is a schematic diagram of an amplitude control block in an equalization system, in accordance with the present invention.

An example averaging algorithm control logic for amplitude control is shown in FIG. 13. The amplitude control (1300) includes a decoder logic block (1310), a state logic block (1320), a counter block (1330), and an amplitude setting block (1340). The decoder logic block (1310) receives the sample data points (T1_SP1, T3_SP1) from the sampling logic block previously discussed, and generates two signals (OVERAMPLITUDE, UNDERAMPLITUDE). One of the timing signals ($T3_{13}$ SIG) from the timing delay block previously discussed is used as a clock signal for the state logic (1320). The timing signal (T3_SIG) may also be used as a clock signal for the counter (1330) and amplitude setting (1340) blocks The state logic (1320) generates four output signals (RST, EN, UP and DWN) in response to five signals (OVERAMPLITUDE, UNDERAMPLITUDE, T3_SIG, CNT and RESET) that it receives. The counter block (1330) generates a count signal (CNT) in response to the RST, EN, and $T3_{13}$ SIG signals. The amplitude setting block (1340) produces the AMPCTL signal in response to the UP, DWN, $T3_{13}$ SIG, and RESET signals.

The decoder logic (1310) determines the current signal condition (OVERAMPLITUDE, UNDERAMPLITUDE, or neither OVERAMPLITUDE nor UNDERAMPLITDE) based on the sample points as discussed previously with reference to FIGS. 4–7. During each clock cycle (e.g., T3_SIG), the state logic evaluates the input signals OVERAMPLITUDE, UNDERAMPLITUDE, and CNT. The counter (1330) will count the number of times that the UNDERAMPLITUDE, or OVERAMPLITUDE signal is active, corresponding to the number of occurrence of the over-amplitude and under-amplitude signal conditions in the current data signal. The EN line is asserted by the state logic (1320) each time a condition persists. The counter (1330) increases the current count (CNT) each clock cycle that the EN line is active.

In one embodiment of the present invention, the state logic (1320) will not change the current amplitude settings (AMPCTL) unless one of the above-discussed conditions persists for more than a predetermined number of clock intervals. For example, n− consecutive clock intervals of OVERAMPLITUDE results in the state logic (1320) determining that the amplitude setting (AMPCTL) should be decreased, while n-consecutive intervals of UNDERAMPLITUDE results in the state logic (1320) determining that the amplitude setting (AMPCTL) should be increased. The UP and DOWN signals are activated by the state logic (1320) to increase or decrease the amplitude setting (AMPCTL). When the signal condition changes to the opposite signal condition during a particular count (i.e., changes from OVERAMPLITUDE to UNDERAMPLITUDE), the state logic (1320) resets the counter (1330) by asserting the RST signal.

In one example of the present invention, the counter (1330) is not reset by the state logic (1320) when the current signal condition changes from either of the OVERAMPLITUDE and UNDERAMPLITUDE conditions to neither the OVERAMPLITUDE condition nor the UNDERAMPLITUDE condition. An example system may require n time intervals of the OVERAMPLITUDE condition before determining that the amplitude setting (AMPCTL) should be decreased. If at any time before the nth time interval (i.e., n−1) the current condition changes to UNDERAMPLITUDE, the counter (1330) will be reset. However, if the current signal condition changes at a time interval before the nth time interval (i.e., n−1) from OVERAMPLITUDE to neither the OVERAMPLITUDE nor the UNDERAMPLITUDE condition, the counter (1330) will retain the current count and not be reset. Alternatively, the state logic (1320) may be arranged to reset the counter (1330) whenever the current signal condition changes from one condition to any other condition.

In another embodiment of the present invention, the reset and enable (RST, EN) for the counter (1330) are the same control line. The current amplitude setting (AMPCTL) corresponds to a number of control bits (k) that are used by the peak detectors. The number of amplitude control bits (k) can be increased or decreased to adjust the stepping resolution of the amplitude adjustment.

Although the equalizer and amplitude control blocks are shown as separate control blocks in FIGS. 8, 12, and 13, in light of the above disclosure it is understood and appreciated that the functional blocks may be combined in-part or wholly into a single block.

The equalizer and amplitude control blocks discussed above will reset their respective counters whenever the opposite condition occurs during a particular input signal condition (e.g. OVERSHOOT, UNDERSHOOT, OVER- AMPLITUDE, UNDERAMPLITUDE). By resetting their counters, errors in the detected condition will be reduced by averaging out the condition over many clock cycles. The equalization and amplitude control blocks can be reset during power up or at any other desired time using the RESET control signal.

In one embodiment of the present invention, additional logic is included to lock the equalizer and amplitude settings after a predetermined time interval. In yet another embodiment of the present invention, the equalizer settings (EQCTL) and the amplitude settings (AMPCTL) are only adjusted during a power up sequence. In still another embodiment of the present invention, the equalizer settings (EQCTL) and the amplitude settings (AMPCTL) are adjusted continuously or only during certain time periods such as during a video-screen blanking period. In still yet another embodiment of the present invention, the equalizer settings (EQCTL) and the amplitude settings (AMPCTL) are adjusted by monitoring a first channel (e.g., a clock channel), and the same equalizer and amplitude settings are also applied to other channels (e.g., data channels).

The above specification, examples and data provide a complete description of the manufacture and use of the composition of the invention. Since many embodiments of the invention can be made without departing from the spirit and scope of the invention, the invention resides in the claims hereinafter appended.

We claim:

1. An apparatus for equalizing an input signal that has a pulse-width defined between a first edge and a second edge, comprising:
    an equalizer circuit that produces an equalized signal in response to the input signal and an equalizer control signal such that the equalizer control signal selectively controls a characteristic of the equalizer circuit to shape the equalized signal from the input signal;
    a data slicer circuit that produces a data signal in response to the equalized signal, the data signal corresponding to a digital representation of the equalized signal;
    a comparator circuit that produces a comparator output signal in response to a comparison between the equalized signal and a peak level signal;
    a sampling circuit that samples data points within a sampling window in response to the comparator output signal and the data signal, the sampling window having edges that correspond to the pulse-width of the input signal, wherein the sampled data points include a first sampled data point and a second sampled data point, the first sampled data point corresponding to a sample of the output of the comparator circuit after the first edge of the input signal, and the second sampled data point corresponding to another sample of the output of the comparator circuit in response to the data signal such that the sampled data points correspond to sampled points from the equalized signal within the pulse-width of the input signal; and
    a digital control logic circuit that produces the equalizer control signal in response to a persistent condition that is determined from the sampled data points such that the equalizer control signal adjusts the equalizer circuit in response to the persistent condition.

2. An apparatus as in claim 1, wherein the characteristic of the equalizer circuit is a gain of the equalizer circuit such that the gain of the equalizer circuit is responsive to the equalizer control signal.

3. An apparatus as in claim 1, wherein the equalizer circuit includes a high pass filter that has a transfer function that is an inverse transfer function corresponding to cable loss characteristics such that the equalizer circuit reduces errors in the input signal.

4. An apparatus as in claim 1, wherein the equalizer circuit has a predetermined number of equalizer settings that are responsive to the equalizer control signal, and the equalizer control signal includes control bits that correspond to the predetermined number of equalizer settings.

5. An apparatus as in claim 1, further comprising a peak level adjustment circuit that is arranged to produce the peak level signal in response to an amplitude control signal, and the digital control logic circuit is arranged to produce the amplitude control signal in response to another persistent condition that is determined from the sampled data points such that the peak level signal is adjusted by the amplitude control signal in response to the another persistent condition.

6. An apparatus as in claim 1, further comprising a peak detection circuit that produces the peak level signal in response to the equalized signal and an amplitude control signal.

7. An apparatus as in claim 1, wherein the input signal is a differential input signal, the equalized signal is a differential equalized signal, the peak level signal is a differential peak level signal, and the comparator circuit is arranged to produce the comparator output signal in response to a comparison between the differential equalized signal and the differential peak level signal.

8. An apparatus as in claim 1, wherein the equalized signal is a differential equalized signal that includes a top equalized signal and a bottom equalized signal, the peak level signal is a differential peak level signal that includes a top peak level signal and a bottom peak level signal, and the comparator circuit is arranged such that the comparator output signal is; a first logic level when the top equalized signal exceeds the top peak level signal, the first logic level when the bottom equalized signal drops below the bottom peak level signal, and a second logic level that is different from the first logic level when the top equalized signal is below the top peak level signal and the bottom equalized signal is above the bottom peak level signal.

9. An apparatus as in claim 1, wherein the equalized signal is a differential equalized signal including a top equalized signal and a bottom equalized signals the peak level signal is a differential peak level signal including a top peak level signal and a bottom peak level signal, wherein the top peak level signal is produced by a top peak detection circuit that includes a first peak detector and a first buffer amplifier, the bottom peak level signal is produced by a bottom peak detection circuit that includes a second peak detector and a second buffer amplifier, the first peak detector detecting a high-peak amplitude of the equalized top signal, the second peak detector detecting a low-peak amplitude of the equalized bottom signal, the first buffer amplifier produces the top peak level signal in response to the high-peak amplitude and an amplitude control signal, and the second buffer amplifier produces the bottom peak level signal in response to the low-peak amplitude and the amplitude control signal such that the amplitude control signal adjusts the levels of the top and bottom peak level signals.

10. An apparatus as in claim 1, further comprising:
    a peak detector that detects a peak amplitude of the equalized signal; and
    a buffer amplifier that produces the peak level signal in response to the peak amplitude and a peak control signal such that the buffer amplifier scales the peak amplitude in response to the peak control signal to produce the peak level signal.

11. An apparatus as in claim 10, wherein the buffer amplifier has a predetermined number of amplitude settings that are responsive to the peak control signal, and the peak control signal includes amplitude control bits that correspond to the predetermined number of amplitude settings.

12. An apparatus as in claim 1, wherein the equalizer control signal is adjusted by the digital control logic circuit during at least one of an initial training time, a continuous time, and a periodic time interval.

13. An apparatus as in claim 1, wherein the persistent condition is an over-shoot condition when the first sampled data point indicates a first logic level and the second sampled data point indicates a second logic level that is different from the first logic level for a persistent time interval, the persistent condition is an under-shoot condition when the first sampled data point indicates the second logic level and the second sampled data point indicates the first logic level for the persistent time interval, wherein the digital control logic circuit is arranged to adjust the equalizer control signal to compensate for the over-shoot and under-shoot conditions.

14. An apparatus as in claim 1, wherein the persistent condition is an over-amplitude condition when the first sampled data point indicates a first logic level and the second sampled data point indicates the first logic level for a persistent time interval, the persistent condition is an under-amplitude condition when the first sampled data point indicates a second logic level that is different from the first logic level and the second sampled data point indicates the second logic level for the persistent time interval, wherein the digital control logic circuit is arranged to adjust the peak level signal to compensate for the over-amplitude and under-amplitude conditions.

15. An apparatus as in claim 1, wherein the digital control logic circuit includes a decoder logic circuit, a state logic circuit, a counter circuit, and an equalizer setting circuit, wherein the decoder logic circuit is arranged to evaluate the sampled data points to determine a current condition of the equalized signal, wherein the state logic circuit is arranged to control the counter circuit in response to the current condition and to adjust the characteristic of the equalizer circuit such that equalizer settings are changed when a count of the counter circuit reaches a predetermined count level, the predetermined count level indicating that the current condition of the equalized signal is the persistent condition.

16. An apparatus as in claim 15, wherein the equalizer setting circuit is arranged to produce at least one of an amplitude adjustment setting and an equalizer adjustment setting, wherein the amplitude adjustment setting is effective to control the peak level signal, and the equalizer adjustment setting is effective to control the characteristic of the equalizer circuit.

17. An apparatus as in claim 15, wherein the state logic circuit is arranged to increment the count of the counter circuit when the current condition is the same as a previous condition, and the state logic circuit is arranged to reset the count of the counter circuit when the current condition is an opposite condition to the previous condition.

18. An apparatus as in claim 17, wherein the state logic circuit is arranged to reset the count of the counter circuit when the current condition is different from both the opposite condition and the previous condition.

19. An apparatus as in claim 1, wherein the sampling circuit a timing delay circuit that produces a first timing signal and a second timing signal, and the sampling circuit produces the sampled data points in response to the first timing signal, the second timing signal and the output of the comparator circuit, wherein the first timing signal is a logic pulse that is responsive to rising and falling edges of the data signal, and the second timing signal is another logic pulse that occurs a predetermined time delay after one of the rising and falling edges of the data signal such that the logic pulse and the another logic pulse occur within the pulse-width of the input signal.

20. An apparatus as in claim 19, wherein the comparator circuit includes a reset control input that is coupled to the first timing signal such that the output of the comparator circuit is periodically reset to a first logic level, and the output of the comparator circuit indicates a second logic level that is different from the first logic level when the equalized signal exceeds the peak level signal.

21. An apparatus as in claim 20, wherein the sampling circuit comprising:
a first logic circuit that includes a first output signal that is periodically reset to the first logic level in response to the second timing signal, the first output signal indicating the second logic level when the output of the comparator circuit changes from the first logic level to the second logic level;
a second logic circuit that includes a second output signal that follows the fist output signal in response to the first timing signal;
a third logic circuit that includes a third output signal that follows the second output signal in response to the second timing signal, wherein the third output signal corresponds to a first of the sampled data points; and
a fourth logic circuit that includes a fourth output signal that follows the output of the comparator circuit in response to the second timing signal, wherein the fourth output signal corresponds to a second of the sampled data points.

22. A method for equalizing an input signal with an equalizer, wherein the input signal a pulse-width defined between a first edge and a second edge, comprising:
equalizing the input signal to produce an equalized signal;
comparing the equalized signal to a peak level to produce a comparator output;
sampling a first data point from the comparator output;
sampling a second data point from the comparator output, wherein the first and second data points correspond to sampled points that are within the pulse-width of the input signal;
analyzing the first and second data points to determine a condition of the equalized signal;
analyzing the condition of the equalized signal to determine when a persistent condition on the equalized signal exists; and
adjusting equalization settings of the equalizer in response to the persistent condition, when the persistent condition persists for a predetermined interval such that the input signal is properly equalized.

23. A method as in claim 22, analyzing the first and second data points further comprising:
detecting an over-amplitude condition when the first and second data points indicate a first logic level;
detecting an under-amplitude condition when the first and second data points indicate a second logic level that is different from the first logic level;
detecting an over-shoot condition when the first data point indicates the first logic level and the second data point indicates the second logic level; and
detecting an under-shoot condition when the first data point indicates the second logic level and the second data point indicates the first logic level.

24. A method as in claim 22, analyzing the condition of the equalized signal further comprising:
- analyzing the first and second data points from a first sample time;
- analyzing the first and second data points from a second sample time that is subsequent to the first sample time;
- comparing the first data point from the first sample time to the first data point from the second sample time to produce a first point comparison; and
- comparing the second data point from the first sample time to the second data point from the second sample time to produce a second point comparison.

25. A method as in claim 24, further comprising:
- increasing a persistence counter when the first point comparison and the second point comparison indicate that the first and second data points are unchanged from the first sample time to the second sample time; and
- resetting the persistence counter when at least one of the first point comparison and the second point comparison indicates that at least one of the first and second data points have changed from the first sample time to the second sample time.

26. A method as in claim 24, further comprising:
- detecting an over-amplitude condition when the first and second data points indicate a first logic level;
- detecting an under-amplitude condition when the first and second data points indicate a second logic level that is different from the first logic level, wherein the under-amplitude condition is an opposite condition to the over-amplitude condition;
- detecting a first other condition when the first data point and the second data point indicate the condition of the equalized signal is other than the over-amplitude condition and the under-amplitude condition; and
- storing a first previous signal condition that corresponds to the condition of the equalized signal from the first sample time, wherein the first previous signal condition corresponds to one of the over-amplitude condition and the under-amplitude condition;
- increasing a first persistence counter when the condition of the equalized signal from the second sample time corresponds to the first previous signal condition; and
- resetting the first persistence counter when the condition of the equalized signal from the second sample time corresponds to the opposite condition to the first previous signal condition.

27. A method as in claim 26, further comprising resetting the first persistence counter when the condition of the equalized signal from the second sample time corresponds to the first other condition.

28. A method as in claim 26, further comprising:
- determining when the first persistence counter has reached a predetermined count level;
- adjusting the equalization settings of the equalizer in response to a first type of persistent condition when the predetermined count level corresponds to a first predetermined interval;
- adjusting the peak level in response to a second type of persistent condition when the predetermined count level corresponds to a second predetermined interval; and
- resetting the first persistence counter after completing the adjustments to at least one of the equalization settings and the peak level, whereby the equalization of the input signal is adjusted by adjusting the peak level and the equalization level.

29. A method as in claim 24, further comprising:
- detecting an over-shoot condition when the first data point indicates the first logic level and the second data point indicates the second logic level; and
- detecting an under-shoot condition when the first data point indicates the second logic level and the second data point indicates the first logic level, wherein the under-shoot condition is an opposite condition to the over-shoot condition;
- detecting a second other condition when the first data point and the second data point indicate the condition of the equalized signal is other than the over-shoot condition and the under-shoot condition; and
- storing a second previous signal condition that corresponds to the condition of the equalized signal from the first sample time, wherein the second previous signal condition corresponds to one of the over-shoot condition and the under-shoot condition;
- increasing a second persistence counter when the condition of the equalized signal from the second sample time corresponds to the second previous signal condition; and
- resetting the second persistence counter when the condition of the equalized signal from the second sample time corresponds to the opposite condition to the second previous signal condition.

30. A method as in claim 29, further comprising resetting the second persistence counter when the condition of the equalized signal from the second sample time corresponds to the second other condition.

31. A method as in claim 22, further comprising adjusting other equalization settings of another equalizer in response to the persistent condition wherein the equalization settings and the other equalization settings are the same such that an other input signal is equalized by the other equalizer similar to the input signal that is equalized by the equalizer.

32. An equalization system that includes a first sample point and a second sample point from an input signal that has a pulse-width defined between a first edge and a second edge, comprising:
- a means for equalizing the input signal produces an equalized signal in response to the input signal and an equalization control signal;
- a means for comparing produces a comparator output signal in response to a comparison between the equalized signal and a peak level signal;
- a means for sampling samples the comparator output signal to produce the first sample point and the second sample point in response to the equalized signal and the comparator output signal, the first sample point corresponding to a sample of the comparator output signal after the first edge of the input signal, and the second sample point corresponding to another sample of the comparator output signal within the pulse-width of the input signal; and
- a means for adjusting adjusts at least one of the peak level signal and the equalization control signal in response to the first sample point and the second sample point such that equalization of the input signal is adjusted.

33. An apparatus as in claim 32, further comprising:
- a means for analyzing determines a condition of the equalized signal by analyzing the first sample point and the second sample point; and
- a means for determining persistence determines when the condition of the equalized signal becomes a persistent condition.

34. An apparatus as in claim 32, wherein the condition is at least one of an over-amplitude condition, an under-amplitude condition, an over-shoot condition, and an under-shoot condition.

35. An apparatus as in claim 32, wherein the condition of the equalized signal is persistent when the condition has continued for a predetermined number of consecutive occurrences.

36. An apparatus as in claim 32, further comprising:
a means for increasing an equalization level adjusts the equalization control signal such that the equalization level is increased when an under-shoot condition is persistent; and
a means for decreasing the equalization level adjusts the equalization control signal such that the equalization level is decreased when an over-shoot condition is persistent.

37. An apparatus as in claim 32, further comprising:
a means for increasing the peak level signal that increases the peak level signal when an under-amplitude condition is persistent; and
a means for decreasing the peak level signal that decreases the peak level signal when an over-amplitude condition is persistent.

38. An equalization system that includes a first sample point and a second sample point from an input signal that has a pulse-width defined between a first edge and a second edge, comprising:
a means for equalizing the input signal produces an equalized signal in response to the input signal and an equalization control signal;
a means for comparing produces a comparator output signal in response to a comparison between the equalized signal and a peak level signal;
a means for sampling samples the comparator output to produce the first sample point and the second sample point in response to the equalized signal and the comparator output signal, wherein the first sample point corresponding to a sample of the comparator output signal after the first edge of the input signal, and wherein the second sample point corresponding to another sample of the comparator output signal;
a means for evaluating the first sample point and the second sample point to identify a signal condition associated with the input signal;
a means for increasing the peak level signal when the signal condition corresponds to an under-amplitude condition; and
a means for decreasing the peak level signal when the signal condition corresponds to an over-amplitude condition.

39. An equalization system that includes a first sample point and a second sample point from an input signal that has a pulse-width defined between a first edge and a second edge, comprising:
a means for equalizing the input signal produces an equalized signal in response to the input signal and an equalization control signal;
a means for comparing produces a comparator output signal in response to a comparison between the equalized signal and a peak level signal;
a means for sampling samples the comparator output signal to produce the first sample point and the second sample point in response to the equalized signal and the comparator output signal, wherein the first sample point corresponding to a sample of the comparator output signal after the first edge of the input signal, and wherein the second sample point corresponding to another sample of the comparator output signal;
a means for evaluating the first sample point and the second sample point to identify a signal condition associated with the input signal;
a means for increasing an equalization level adjusts the equalization control signal such that the equalization level is increased when the signal condition corresponds to a an under-shoot condition; and
a means for decreasing the equalization level adjusts the equalization control signal such that the equalization level is decreased when the signal condition corresponds to an over-shoot condition.

* * * * *